Figure 1:
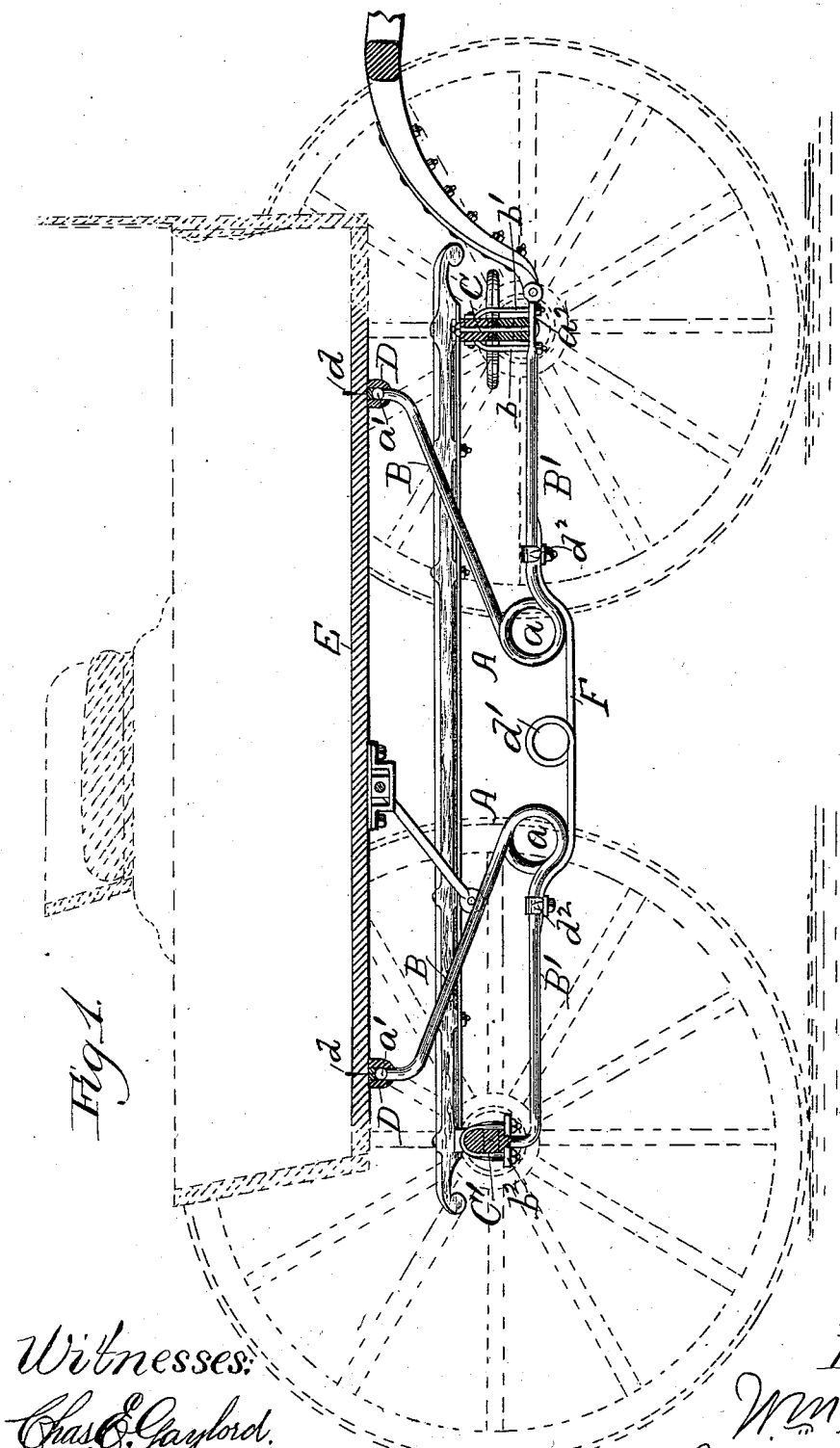

(No Model.)

W. H. SHOLL.
VEHICLE SPRING.

No. 306,649.  Patented Oct. 14, 1884.

Witnesses:
Chas. E. Gaylord.
M. J. Halleck

Inventor:
Wm. H. Sholl
By G. B. Coupland & Co.
Attys.

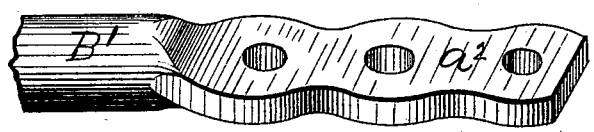
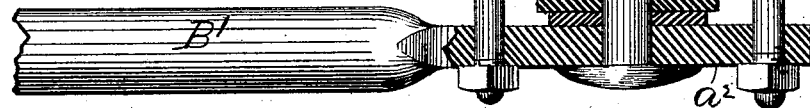
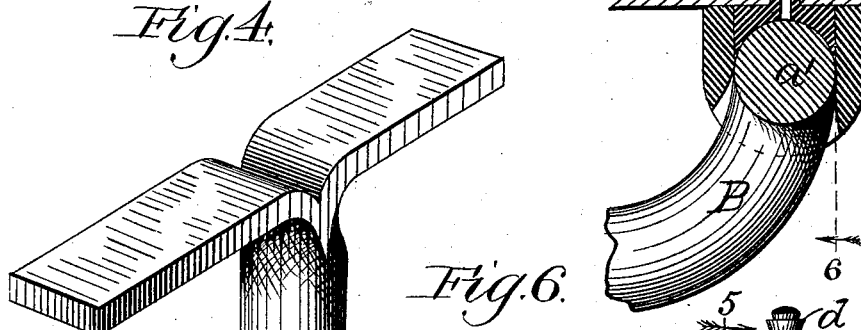
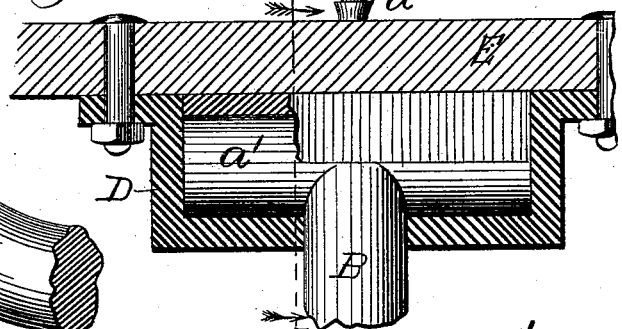

UNITED STATES PATENT OFFICE.

WILLIAM H. SHOLL, OF HOBART, INDIANA.

VEHICLE-SPRING.

SPECIFICATION forming part of Letters Patent No. 306,649, dated October 14, 1884.

Application filed November 9, 1883. (No model.)

*To all whom it may concern:*

Be it known that I, WILLIAM H. SHOLL, of Hobart, in the county of Lake and State of Indiana, have invented certain new and useful Improvements in Springs for Vehicles, of which the following is a full, clear, and exact description, that will enable others to make and use the same, reference being had to the accompanying drawings, forming a part of this specification.

The object of my invention is to provide a spring that is light, simple, and durable, and which is adapted to be attached to vehicles of various forms, but is more especially intended for side-bar buggies, and may be attached to the corners of the bodies or the center ends.

The nature of this invention consists in constructions and combinations, the arrangement and operation of which will be hereinafter more fully set forth in detail.

Figure 1 is a vertical longitudinal section, in part, of a vehicle, showing the construction and arrangement of the spring; and Figs. 2, 3, 4, 5, and 6 are detached sectional details of construction.

Referring to the drawings, A represents the spring, which is made of a single piece of metal and bent around itself in the middle to form the coiled body $a$ of the spring, as shown in Fig. 1 of the drawings. The two arms B B' project in the same direction from the coiled body, but are widely separated. The upper arm extends upward, and is slightly curved near the end, which terminates in the T-shaped head $a'$. The lower arm, B', may lie in a horizontal plane or decline a little from a right line, as practical working may seem to require, the curved end terminating in a flattened shape in accordance with the part to which it is to be attached. For instance, if the end of the lower arm is to be attached to the head-block or front axle, it will be of the shape shown in Fig. 2, while for attachment to the rear axle the end will be of the shape shown in Fig. 4. The flattened end $a^2$ is perforated for the reception of the retaining-bolts $b\ b'$, and the king-bolt C forms the axis of oscillation. The bolts $b\ b'$ stand away from the axle, so as to permit of a pivotal action of these parts, but are bent inward at the head and attached by means of the screws $a^3\ a^4$. When the lower spring-arm is to be attached to the rear axle, it will be made in the form shown in Fig. 4, and be secured in place by means of a suitable clip, C', passing down over the top of the axle and through the clamping-plate $b^2$, by which means the end of the spring-arm is clamped between the plate and the under side of the rear axle, as shown in Fig. 1 of the drawings. The box D is secured to the under side of the body E of the vehicle, and provides a suitable bearing for the play of the round T-shaped head of the upper spring-arm.

Fig. 5 shows a transverse section of the box and head of the spring-arm in the plane 5 5, Fig. 6; and Fig. 6, a longitudinal section in the plane 6 6, Fig. 5, which fully illustrates the relative position and arrangement of these parts. The heads of the spring-arm B may be lubricated through the oil-passage $d$.

As shown in Fig. 1 of the drawings, two springs are made use of, being placed in the center and at each end of the body-box; but, if necessary, four springs can be employed and placed at the corners. The inner ends of the springs are connected by means of the reach F, which is composed of a single piece of metal coiled in the center to form the spring-loop $d'$, the ends from thence passing underneath the body of the springs, and being secured to the lower arms just back of the coiled body by means of the clips $d^2$. This arrangement serves to equalize and regulate the movement and action of the springs relative to each other. By this form of construction and arrangement a spring is provided that is light, cheap, and durable, and which readily and easily yields to lessen the jar incident to inequalities in the road.

I am aware that a coiled spring having one end pivoted to the frame and the other end rigidly attached to the body is old. My device differs from that form, in that one end of the spring is pivoted to the body and the other rigidly attached to the axle. By this construction all danger of the spring being wrenched from the bottom is obviated, as the pivoted end will permit sufficient play of the parts, whereas when the end of the spring is rigidly attached to the bottom of the body every movement of the latter makes a wrenching strain upon the attaching device, which if the bottom be made of weak material will be pulled out.

Having thus described my invention, what I claim as new, and desire to secure by Letters Patent, is—

1. The combination, with the body and axle of a wagon, of a spring coiled near its center, and having one end rigidly attached to the axle, and the other pivoted to the under side of the body, substantially as described.

2. The combination, with the body and axle of a wagon, of a projecting spring coiled near its center, and having one end rigidly attached to the forward axle by the king-bolt and bolts $b$ and $b'$, and its other end pivoted to the bottom of the body, substantially as described.

3. The combination, with two or more springs, as described, of the connecting-reach F, composed of a single piece of metal coiled in the center to form the spring-loop $d'$, and having the ends extending in opposite directions therefrom, and attached to the lower arms of the springs A, substantially as set forth.

WILLIAM H. SHOLL.

Witnesses:
F. H. HARPER,
THOMAS R. HARRISON.